May 25, 1954  J. F. EHRENFRIED ET AL  2,679,194
THERMOSEALABLE PACKAGE
Filed March 10, 1952
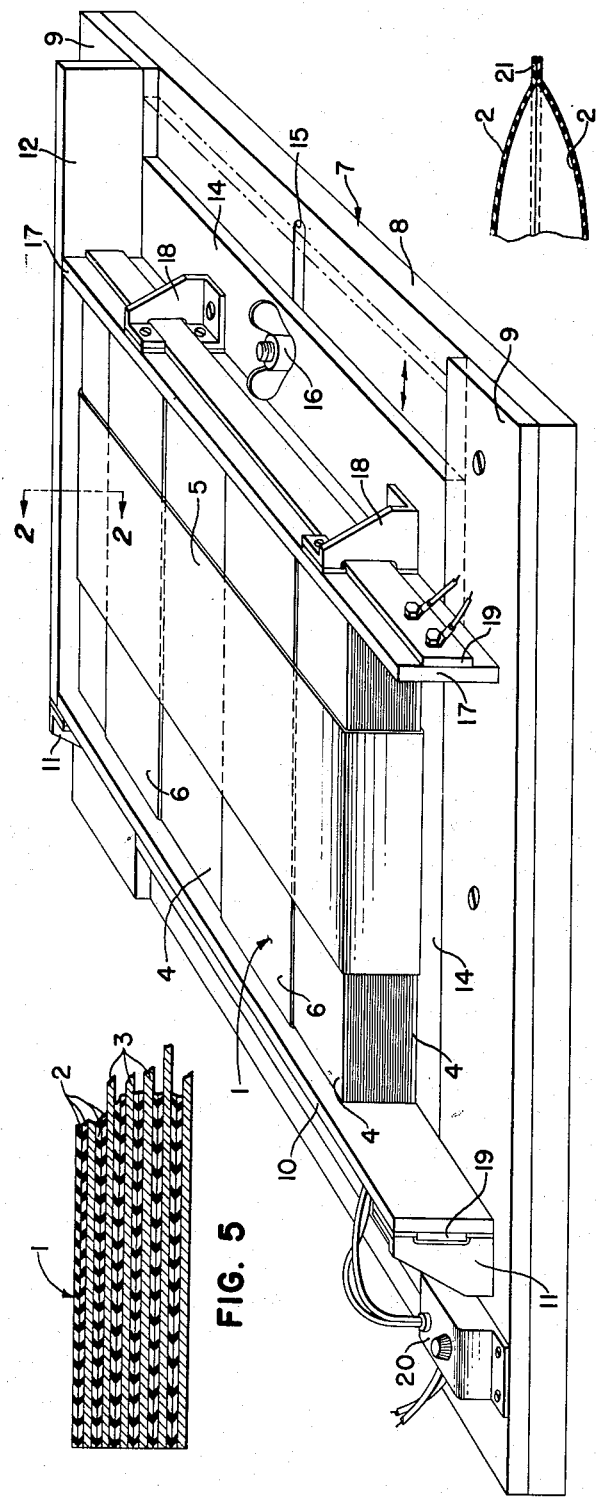
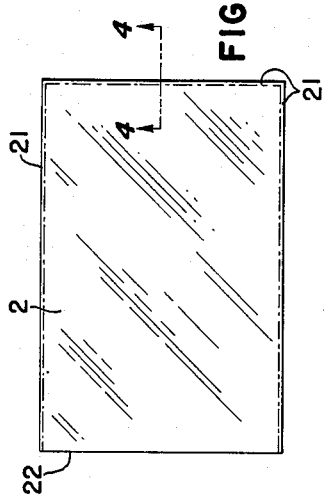
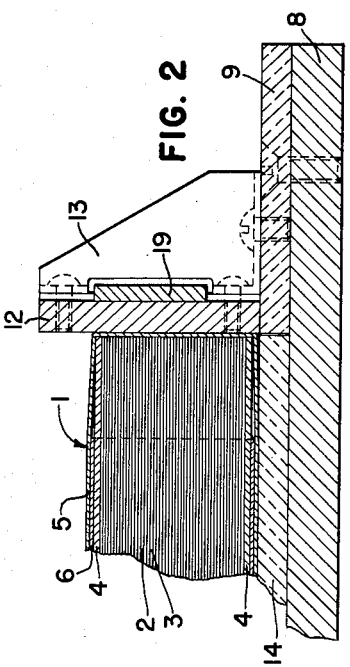
INVENTOR.
JOHN F. EHRENFRIED
BY JUNIUS A. TRICHE, JR.
ATTORNEY Patented May 25, 1954

2,679,194

UNITED STATES PATENT OFFICE 2,679,194

THERMOSEALABLE PACKAGE

John F. Ehrenfried and Junius A. Triche, Jr., Akron, Ohio, assignors, by mesne assignments, to The Goodyear Tire & Rubber Company, a corporation of Ohio Application March 10, 1952, Serial No. 275,816

7 Claims. (Cl. 93—8)

The present invention relates to the manufacture of bags and the like from heat sealable material for use in the packaging of various products in the general merchandising field. More particularly, the invention pertains to a method of and apparatus for producing such containers as well as to a type of assembly of the blanks employed in multiple sealing operations wherein a large number of bags are simultaneously formed.

Since the advent of a modern packaging industry, it has been a problem to produce transparent or translucent bags in a rapid and economical manner because of the difficulty encountered in effecting strong seals. When the seal is completed, the molecular structure is disturbed. Sufficient time must be allowed for molecular reorientation in order to prevent blocking, or adhesion one to another. Such products as fresh fruits and vegetables require a transparent vapor resistant material for proper marketability. These materials must be readily sealable so that bags can be quickly produced and so that strong closure seals can be effected at the processing point. Materials which have proved effective in this regard are cellophane, various cellulosic materials and various synthetic films such as halogenated rubbers, polyethylene, and the vinyl-vinylidine chloride copolymers known as Sarans.

Various methods have been used to overcome blocking. Bags have been produced on long conveyors where sufficient time is allowed after the sealing process for the bags to become non-tacky. Various means for mechanical separation have been devised. For example, abrasives have been used to coat the seals, but this destroys transparency. Various non-tacky materials have been used as insulators between the bags to effect separation until they are cool.

Still another method has been devised to increase the speed of producing bags. This process is called bulk sealing. Containers are produced by the simultaneous edge sealing of a stack of bag blanks, each set of bag blanks being separated from each other by means of a suitable insulating material in the form of a heat stable slip sheet. This invention is concerned with improvements in making bags by bulk sealing.

It is an object of this invention to provide a simple apparatus and process for producing bags from thermoplastic materials.

It is another object of this invention to disclose an improved process for the bulk sealing of rubber hydrochloride wherein a rapid uniform seal is obtained.

A further object of this invention is to provide packages of bag blanks which can be sealed and stacked together while tacky without danger of adhering to each other.

Another object of this invention is to provide an apparatus and a process for producing thermosealable bags which are so uniquely simple as to allow rapid bag production by persons unskilled in the art, for example, store employees. These and other objects will be apparent as the description proceeds.

In the drawings Figure 1 is a perspective view of one form of sealing apparatus embodying the principles of the present invention and containing a package of bag blanks to be sealed. Figure 2 is a cross-section on an enlarged scale taken along the line 2—2 of Figure 1, showing one edge of the sealing apparatus in adjacent relation to the end of the package of bag blanks. Figure 3 shows a plan view of a finished bag. Figure 4 is a cross-section of a finished bag taken along the line 4—4 of Figure 3. Figure 5 is a magnified partial sectional view corresponding to Figure 2 taken through the package of bag blanks.

In practicing this invention, the package of bag blanks identified generally by the reference numeral 1 is made by superposing alternate layers of bag blanks 2 and heat stable insulators or slip sheets 3 (Fig. 5). The bag blanks 2 can be produced in the customary manner from any of the known thermoplastic film materials available in the art. Preferably, rubber hydrochloride is used, ranging in thickness from about .0008" to .001". Thickness of the film is not critical, but the time and temperature necessary for sealing is dependent on the thickness of the film material being sealed and the width of the seal desired. In the practice of this invention a strong seal of .0008 inch rubber hydrochloride film can be effected in four minutes at 350° F. An adequate seal for certain purposes can be effected with a time interval as short as one half minute. The temperature can vary from the minimum temperature at which the material being sealed is thermoplastic to the char temperature of the material. As the time is decreased, the temperature must be increased in order to get the proper heat penetration.

Production rolls of rubber hydrochloride film are made by processes disclosed in the art. These rolls are then slit into smaller widths convenient for the manufacture of bags. Two narrow rolls of film and a roll of heat stable insulating material, such as paper, are placed in a conventional sheeting machine which prepares packages comprising alternately arranged layers 2 embodying at least two superposed bag blanks and corresponding layers 3 comprising at least one insulating member. These stacks of bag blanks and insulators are then cut to uniform bag dimensions by means of a guillotine cutter.

After the stack of bag blanks and slip sheets has been prepared, it is essential that the bag blanks and slip sheets be held in rigid relationship to each other so that a uniform seal of the several bag blanks can be effected. In the practice of this invention, a substantially inflexible hard board material 4 exactly the size of the blanks is placed on the top or bottom of the stack or on both top and bottom. The entire assembly is then maintained in rigid relationship by means of encircling bands 5, 6, 6 of a suitable heat stable material such as paper, the band 5 encircling the package from top to bottom and the bands 6, 6 encircling the package from side to side.

The foregoing procedure insures that lateral movement of the package 1 is prevented and a uniform seal of the blanks 2 disposed between the slip sheets 3 is made possible. Also, if desirable for merchandising, a complete single overwrap of non-tacky material, such as paper, can be used without affecting sealability.

In the practice of this invention, the sealing of the several bag blanks 2 is accomplished by means of apparatus of the type shown in Fig. 1 of the drawings and identified by the reference numeral 7. The sealing apparatus 7 comprises a base 8 having the guide members 9 rigidly attached thereto in spaced generally parallel relation to each other. A heating panel 10 is rigidly mounted on the members 9 by means of brackets 11 so that the heating panel is in perpendicular relation to the base 8. An end heating panel 12 is rigidly attached to one of the members 9 by means of brackets 13 (Fig. 2).

An insulating platen member 14 is disposed in slidable relation to the base 8 and between the members 9. The slot 15 and the bolt and wing nut 16 allow lateral movement of the platen member 14 while providing for rigid attachment thereto in any predetermined position. The platen member 14 can be made from any suitable insulating material such, for example, as asbestos-cement sheets known as Transite, fiber glass board, resin impregnated materials or glass. In the practice of this invention, Transite is particularly well suited for the platen member 14 and the members 9.

Another heating panel 17 is rigidly mounted in perpendicular relation to the sliding platen member 14 by means of brackets 18 so that it is parallel to the opposite heating panel 10 and in slidable relation thereto.

The heating panels 10, 12 and 17 are composed of any suitable conductive material such, for example, as aluminum, steel, Monel metal, brass, bronze or copper. Aluminum is especially suitable because of its light weight and good conductive characteristics. The heating panels 10, 12 and 17 may be heated to the desired temperatures by any known heating medium such as steam, hot water or electricity. As a matter of convenience, electrically activated strip heaters 19, controlled by individual thermostats 20, have been found to be the most advantageous form of heating means.

In effecting production of bags, the thermostats 20 are adjusted to the desired temperature and electrical current is supplied to the several strip heaters 19 causing the heating panels 10, 12 and 17 to be heated uniformly. A separate thermostat is used to control each panel to insure uniform heating. A single thermostat for control of all the panels is operable.

When the heaters reach the predetermined temperature, the package 1 of bag blanks 2 and slip sheets 3 is placed in the apparatus so that a side and an end of the package is in contact with the heating panel 10 and the end heating panel 12, respectively. Next, the adjustable heating panel 17 is moved into position by adjustment of the wing nut 16 so that the three heating panels 10, 12 and 17 are in adjacent relation to the sides and end of the bag blank package 1.

The heat produced in the several heating panels 10, 12 and 17 is sufficient to effect an autogeneous bond between the superposed bag blanks 2 in the package 1. The slip sheets 3 serve to insulate adjacent pairs of bag blanks 2 within the package 1.

One of the important features of the present invention is that the sealing of the several bag blanks 2, 2 is capable of being effected without removing the encircling bands 5, 6 of the package 1. Even though a complete overwrap is used in forming the package 1, sufficient heat can be produced through the overwrap to effect a satisfactory seal of the several bag blanks 2, 2.

As will be noted from Figs. 3 and 4 of the drawings, the seal 21 which is produced between the bag blanks 2, 2 is substantially uniform throughout its length. The results obtained with either form of wrapping will be identical although a greater time factor may be necessary in the event that a complete overwrap is employed. Following the teachings of this invention, bags have been produced having seams so strong that the walls ruptured before the seams failed when pressure tests were made.

After the several bag blanks 2, 2 comprising the package 1 have been sealed in the manner described, the package may be stored, if desired, or it may be opened immediately and the slip sheets removed. The bags 2, 2 are then ready for use.

Although this invention has been described as applicable to the fabrication of square or rectangular bags, it is intended that the invention encompasses production of irregularly shaped bags as well.

While certain representative embodiments and details have been shown for the purpose of illustrating the invention, it will be apparent to those skilled in this art that various changes and modifications may be made therein without departing from the spirit or scope of the invention.

We claim:

1. An apparatus for simultaneously edge sealing a plurality of superposed thermosealable bag blanks, said bag blanks being held in parallel relationship to each other by means of a heat stable overwrap and separated from each other by heat stable insulating sheets, said apparatus comprising a rigid base, electrically activated edge and end strip heaters rigidly mounted on panels in substantially perpendicular relation to said base, an insulating lower platen member in parallel relation to said base and slidably connected thereto, said lower platen member having one of said electrically activated edge heaters mounted on a panel, said panel being rigidly mounted in substantially perpendicular relation to said platen member, and a thermostatic switch for control of said strip heaters mounted on said base.

2. An apparatus for simultaneously edge sealing a plurality of superposed thermosealable bag blanks, said bag blanks being held in parallel relationship to each other by means of heat stable wrappers and separated from each other by heat stable insulating sheets, said apparatus comprising a rigid base; at least two heating panels having strip heaters mounted thereon secured to said base in perpendicular relation thereto and in perpendicular relation to each other for defining the marginal dimensions of the bag blanks to be sealed; a platen member slidably mounted on the base; means for securing the platen member in adjustable position with respect to the base and the heating panels which are mounted thereon; a heating panel having a strip heater mounted thereon and secured to said platen member in substantially perpendicular relation thereto; and thermostatic controls for the strip heaters.

3. A method of preparing containers from heat sealable material comprising preparing a package by stacking together a plurality of superposed container blank units, each of said units including two sheets of rubber hydrochloride and each of said container blank units being separated from each other by substantially heat stable paper slip sheets, wrapping the stacked units with a heat stable wrapper to maintain the superposed parallel edges of the stacked units substantially aligned in a plane perpendicular to the top and bottom planes of the stack, placing said package of container blanks in an apparatus having an electrically activated edge strip heater, an electrically activated end strip heater, and an electrically activated side strip heater mounted parallel to and in slidable relation to said edge strip heater, moving said slidable strip heater into substantially adjacent relation with the package of container blanks, effecting edge seals of said container blanks of said package simultaneously by applying heat thereto through said enclosing wrapper and removing the slip sheets after cooling.

4. The method of preparing containers from heat sealable material comprising preparing a package by stacking together a plurality of superposed container blank units, each of said units including two sheets of a thermosealable material and each of said container blank units being separated from each other by heat stable insulating sheets, wrapping the stacked units with heat stable wrappers to maintain the superposed parallel edges of the stacked units substantially aligned in a plane perpendicular to the top and bottom planes of the stack, placing said package of container blanks in an apparatus having heatable parallel edge panels in slidable relation and a heatable end panel perpendicular to said edge panels and effecting simultaneous edge seals of said container blanks by applying heat thereto.

5. A method of preparing containers from heat sealable material comprising preparing a package by superposing heat sealable container blanks separated by heat stable slip sheets, wrapping said blanks and slip sheets with heat stable wrappers in order to hold the edges in substantial alignment in a plane perpendicular to the top and bottom planes and simultaneously sealing the edges by applying heat thereto through said heat stable wrappers.

6. An apparatus for simultaneously edge-sealing a package of a plurality of superposed rubber hydrochloride bag blanks which are held in parallel relationship with each other by means of an overwrap and separated from each other by means of heat-stable insulating sheets, said apparatus comprising in combination a rigid base; electrically activated strip heaters mounted on panels, said panels being rigidly secured in a vertical plane to said base and mounted in perpendicular relation to each other so that they are capable of defining the marginal dimensions of one end and one side of said package of bag blanks; a platen member slidably mounted on said base; means for securing said platen member in adjustable position with respect to the base; a heating panel having an electrically activated strip heater mounted on said platen member and rigidly secured in perpendicular relation to said platen member so that the unit comprised of the slidably mounted platen member with the rigidly mounted heating panel can be moved into position to marginally define a third side of said package of bag blanks, said end heating element abutting one end of each side heating element, and thermostatic controls for said strip heaters.

7. A method of preparing containers from heat sealable material comprising preparing a package by superposing heat sealable container blanks separated by heat stable slip sheets, encircling said blanks and slip sheets with heat stable bands in order to hold the edges in substantial alignment in a plane perpendicular to the top and bottom planes and simultaneously sealing the edges by applying heat thereto through said heat stable bands.

References Cited in the file of this patent

UNITED STATES PATENTS

| Number | Name | Date |
|---|---|---|
| 1,445,762 | Gerrard | Feb. 20, 1923 |
| 1,885,607 | Knox | Nov. 1, 1932 |
| 2,232,640 | Schwartzman | Feb. 18, 1941 |
| 2,259,239 | Brown | Oct. 14, 1941 |
| 2,274,495 | Muench | Feb. 24, 1942 |
| 2,424,558 | Delano | July 29, 1947 |
| 2,438,156 | Dodge | Mar. 23, 1948 |
| 2,562,146 | Hultkrans | July 24, 1951 |
| 2,600,927 | Scoville | June 17, 1952 |